May 24, 1949.   K. W. ATWATER   2,471,187
COMPOSITE FLOATING BEARING JOURNAL
Filed July 21, 1944

INVENTOR
Karl W. Atwater
BY William B. Jasper
ATTORNEY

Patented May 24, 1949

2,471,187

UNITED STATES PATENT OFFICE 2,471,187

COMPOSITE FLOATING BEARING JOURNAL

Karl W. Atwater, Pittsburgh, Pa.

Application July 21, 1944, Serial No. 545,977

8 Claims. (Cl. 308—238)

This invention relates to sleeve bearings of the floating type and it is among the objects thereof to provide antifriction bearings of a composite construction of metallic and non-metallic members wherein the bearing surfaces alternate between metallic and non-metallic elements.

It is a further object of the invention to provide a composite bearing structure of the above designated character which is especially adapted for efficient lubrication of the bearing surfaces to minimize friction in the relatively movable parts.

Still a further object of the invention is the provision of an antifriction bearing of a composite metallic and non-metallic assembly of bearing parts which is adapted to be insulated against heat and in which the bearing surfaces are exposed to an efficient cooling medium.

Figure 1:
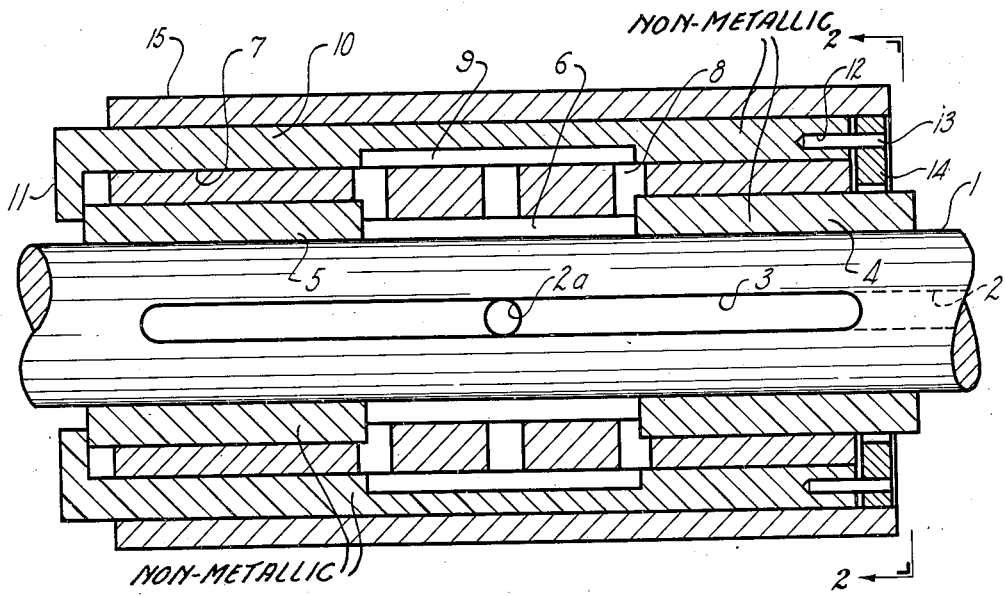
Figure 2:
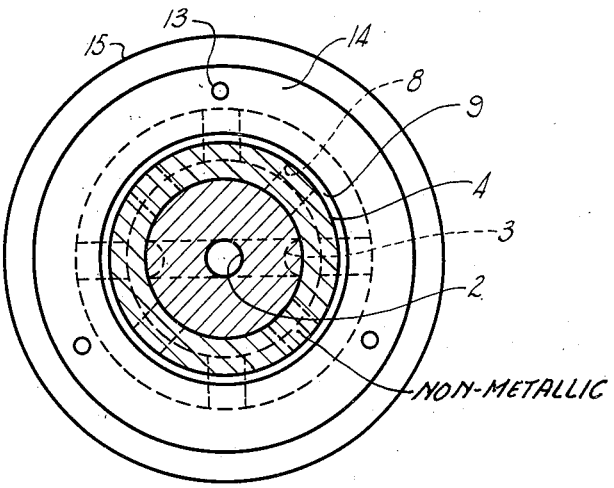

These and other objects of the invention will become more apparent from a consideration of the accompanying drawing constituting a part hereof, in which like reference characters designate like parts, and in which Fig. 1 is a vertical sectional view, partially in elevation, taken longitudinally of a bearing structure embodying the principles of this invention; and Fig. 2 an end elevational view thereof, partially in cross section, taken along the line 2—2 of Fig. 1.

In the drawing, the numeral 1 designates a fixed pin or stud shaft having a central opening or flow passage 2, Fig. 2, and grooves 3 for circulating a lubricating or cooling fluid from a source to the center of the bearing structure. Mounted for rotation on the stud shaft 1 are a pair of non-metallic bearing sleeves 4 and 5, the sleeves 4 and 5 being axially spaced, as shown in Fig. 1, to thereby provide a lubricating chamber designated by the numeral 6. Mounted on the non-metallic sleeve elements 4 and 5 is an integrally formed metal sleeve or bushing 7 having radial openings 8 for conducting the cooling or lubricating fluid from the central chamber 6 to an outer chamber 9.

A non-metallic sleeve 10, having a flange 11 at one end overlapping the bearing sleeve 5, is disposed on the metal sleeve 7 and is provided with drill holes 12 for receiving pins 13 extending through a collar 14 which constitutes a retaining abutment or shoulder for the end of the metal sleeve 7. A sleeve 15 constitutes a cylindrical housing for the bearing assembly and may be of insulating material to protect the bearing if in close proximity to radiating heat.

In operation the non-metallic members 4 and 5 will rotate on the stud shaft 1 and the metal sleeve 7 and non-metallic sleeve 10 will rotate relative to each other and relative to the bearings 4 and 5 and the housing 15, while being exposed to the pressure of the lubricating or cooling fluid. The fluid is supplied through passage 2, the radial opening 2a into the groove 3 and from chambers 6 and 9 which communicate through the radial passages 8, to the respective bearing surfaces of the composite bearing structure. The parts will rotate relative to one another in accordance with the resistance offered by the respective surfaces which results in a uniform operation and a minimum consumption of power. The bearing can be insulated against heat or surrounding temperature by selection of suitable bearing materials, and instead of all of the elements being full bushings or sleeves they may be assembled as half bearings or segments, depending upon the particular use.

The stud shaft 2 may be a rotating member which would not affect the relative rotative movement of the several bearing elements so long as one friction surface compensates the other and always operates in relation to one another, thus constituting the bearing elements floating members of a highly antifriction characteristic.

Although one embodiment of the invention has been herein illustrated and described, it will be evident to those skilled in the art that various modifications may be made in the details of construction without departing from the principles herein set forth.

I claim:

1. A composite bearing structure comprising a plurality of superposed alternate metallic and non-metallic, bearing sleeves journaled for rotation relative to each other and having channelling extending to their respective bearing surfaces and communicating with a source of pressure fluid.

2. A composite bearing structure comprising a plurality of superposed alternate metallic and non-metallic, bearing sleeves journaled for rotation relative to each other and having channelling extending to their respective bearing surfaces and communicating with a source of pressure fluid, some of said bearing sleeves having radial flanges for retaining other of said sleeves against axial displacement.

3. In combination with a journal, of a pair of axially spaced non-metallic bearing sleeves, a metallic sleeve rotatably mounted on said pair of sleeves to constitute the space between the ends of said spaced sleeves a fluid chamber, said metallic sleeve having radial fluid passages in alinement with said fluid chamber, a non-metallic sleeve having a centrally chambered bore mounted on said metallic sleve to form a fluid chamber in communication with said first-named chamber, and a housing sleeve mounted for rotation on said flanged sleeve.

4. In combination with a journal, of a pair of axially spaced non-metallic bearing sleeves, a metallic sleeve rotatably mounted on said pair of sleeves to constitute the space between the ends of said spaced sleeves a fluid chamber, said metallic sleeve having radial fluid passages in alinement with said fluid chamber, a non-metallic sleeve having a centrally chambered bore mounted on said metallic sleeve to form a fluid chamber in communication with said first-named chamber, said sleeve having end flanges constituting axial abutments for other of said sleeves and a housing sleeve mounted for rotation on said flanged sleeve.

5. In combination with a journal, of a pair of axially spaced non-metallic bearing sleeves, a metallic sleeve rotatably mounted on said pair of sleeves to constitute the space between the ends of said spaced sleeves a fluid chamber, said metallic sleeve having radial fluid passages in alinement with said fluid chamber, a non-metallic sleeve having a centrally chambered bore mounted on said metallic sleeve to form a fluid chamber in communication with said first-named chamber, said last named sleeve having a radial flange integrally formed at one end thereof extending to and engaging the end face of one of said pair of sleeves and having a collar mounted on the other end thereof to constitute an axial abutment for the said metallic sleeve whereby all of said sleeves are retained as a self-contained unit.

6. A composite journal bearing structure comprising a stud shaft having a fluid passage extending axially therein and having an outer channel in communication with said fluid passage, a pair of axially spaced non-metallic bearing sleeves overlapping the ends of said channel and forming a space centrally of said channel, a metallic sleeve mounted on said pair of sleeves to constitute the space between the ends of said spaced sleeves a fluid chamber, said metallic sleeve having a radial fluid passage in alinement with said fluid chamber, a non-metallic sleeve having a centrally chambered bore mounted on said metallic sleeve to form a fluid chamber communicating by said radial fluid passages with said first-named chamber, said last-named sleeve having end flanges interacting with the ends of some of said other sleeves and a housing sleeve mounted for rotation on said last-named sleeve.

7. A composite bearing structure comprising a plurality of superposed alternate ferrous and non-ferrous sleeve members journaled for rotation relative to each other and having channels communicating with a source of lubricating or cooling fluid, some of said sleeves being axially spaced to constitute the space therebetween fluid chambers.

8. A composite bearing structure comprising a plurality of superposed alternate ferrous and non-ferrous sleeve members journaled for rotation relative to each other, some of said sleeves being sectional members axially spaced and others of said sleeves extending the full length of said bearing structure to constitute the space between said sections fluid chambers, some of said full length bearing sleeves having radial slots communicating with said fluid chambers.

KARL W. ATWATER.

REFERENCES CITED

The following references are of record in the file of this patent:

UNITED STATES PATENTS

| Number | Name | Date |
|---|---|---|
| Re. 15,058 | Heina | Mar. 8, 1921 |
| 15,817 | Riley | Sept. 30, 1856 |
| 127,661 | Upton | June 4, 1872 |
| 199,400 | Beach | Jan. 22, 1878 |
| 528,278 | Roberts | Oct. 30, 1894 |
| 873,444 | Luburg | Dec. 10, 1907 |
| 1,557,767 | Oliver | Oct. 20, 1925 |
| 1,793,874 | Skillman | Feb. 24, 1931 |

FOREIGN PATENTS

| Number | Country | Date |
|---|---|---|
| 5,304 | Great Britain | 1885 |
| 241,405 | Great Britain | Oct. 22, 1925 |
| 284,654 | Great Britain | Aug. 23, 1928 |
| 553,673 | Great Britain | 1942 |